United States Patent [19]
Gertner et al.

[11] Patent Number: 6,049,775
[45] Date of Patent: Apr. 11, 2000

[54] SYSTEMS, METHODS AND COMPUTER PROGRAM PRODUCTS FOR MONITORING AND CONTROLLING MAIL PROCESSING DEVICES

[75] Inventors: Patricia A. Gertner, Raleigh; William A. Sterling, Cary; Richard C. Nardin, Apex, all of N.C.

[73] Assignee: Bell & Howell Mail and Messaging Technologies Company, Durham, N.C.

[21] Appl. No.: 09/079,620

[22] Filed: May 15, 1998

Related U.S. Application Data

[63] Continuation-in-part of application No. 09/016,715, Jan. 30, 1998.
[60] Provisional application No. 60/085,479, May 14, 1998.
[51] Int. Cl.[7] ............................ G06F 17/60; G05B 15/02
[52] U.S. Cl. .............................. 705/8; 345/326; 345/333; 345/334; 700/9; 700/11; 700/17; 700/95; 700/100
[58] Field of Search ..................................... 345/326, 333, 345/334, 348; 364/138, 140.01, 146, 188, 191, 192, 400, 468.01, 468.06, 468.09; 705/1, 7, 8, 9; 700/9, 11, 17, 95, 100

[56] References Cited

U.S. PATENT DOCUMENTS

| | | | |
|---|---|---|---|
| 3,522,588 | 8/1970 | Clarke, Jr. et al. ................ | 340/825.06 |
| 3,582,621 | 6/1971 | Lawler .................................... | 364/138 |
| 4,346,446 | 8/1982 | Erbstein et al. ....................... | 702/182 |
| 4,517,637 | 5/1985 | Cassell ................................... | 364/138 |
| 4,752,950 | 6/1988 | Le Carpentier ..................... | 379/106.11 |
| 4,798,040 | 1/1989 | Haas et al. ............................ | 53/460.77 |
| 4,837,701 | 6/1989 | Sansone et al. ........................ | 705/405 |
| 5,305,055 | 4/1994 | Ebner et al. ................................ | 399/9 |
| 5,309,556 | 5/1994 | Sismilch ................................ | 345/349 |
| 5,470,218 | 11/1995 | Hillman et al. .......................... | 425/144 |
| 5,471,399 | 11/1995 | Tanaka et al. ........................... | 364/491 |
| 5,628,249 | 5/1997 | Cordery et al. ........................... | 101/91 |
| 5,684,706 | 11/1997 | Harman et al. ..................... | 705/406 X |
| 5,812,394 | 9/1998 | Lewis et al. ............................ | 364/146 |
| 5,859,778 | 1/1999 | Kuroda et al. ..................... | 364/474.11 |
| 5,870,698 | 2/1999 | Riedel et al. ............................ | 702/182 |

*Primary Examiner*—Edward R. Cosimano
*Attorney, Agent, or Firm*—Jenkins & Wilson, P.A.

[57] ABSTRACT

A system, method, device, and/or computer program product for remotely managing a plurality of remote mail processing devices. The system comprises receiving means for receiving operation related information from each of said plurality of remote mail processing devices. The system also includes monitoring means for remotely monitoring operation related information from each of said plurality of remote mail processing devices. Features of the present invention include the ability to create threshold settings for separate mail processing devices and individual jobs running on the separate mail processing devices. Violations of the threshold settings will result in an alarm indicating deviation from pre-set job goals. A user also has the ability to remotely create, maintain, and communicate valid mail processing device operator lists for specified mail processing devices. A run-tag editor is included which allows the user remotely access a stored database of completed job information in order to correct any job identification errors that may have been input by a mail processing device operator.

54 Claims, 17 Drawing Sheets

FIG. 14

SYSTEMS, METHODS AND COMPUTER PROGRAM PRODUCTS FOR MONITORING AND CONTROLLING MAIL PROCESSING DEVICES

RELATED APPLICATIONS

The present application is a Continuation-In-Part Application of, and claims the benefit under 37 C.F.R. §1.53(b) of, application Ser. No. 09/016,715 entitled "Systems, Methods and Computer Program Products for Monitoring and Controlling Mail Processing Devices", filed on Jan. 30, 1998 (pending). The present application also claims priority and benefit under 35 U.S.C. §119(e) of U.S. Provisional Patent Application Ser. No. 60/085,479 entitled "Systems and Method for Monitoring and Controlling Mail Processing Devices", filed on May 14, 1998. Both of the aforementioned patent applications are hereby incorporated herein by reference.

FIELD OF THE INVENTION

The present invention relates generally to mail processing equipment and more particularly to automated mail processing systems. Specifically, the present invention relates to remote monitoring and control of mail processing systems and the features thereof.

BACKGROUND OF THE INVENTION

Customized, high volume mail processing systems are used by financial institutions, insurance companies, public utilities, and various other businesses to prepare and mail letters and packages. Mail processing systems include mail inserting systems, sorting systems, and a range of modular attachments for increasing the productivity of large scale mail production operations. Mail insertion systems include a device known as a mail inserter, which physically "stuffs" individual envelopes with the appropriate contents. Many businesses, such as financial institutions and public utilities, often produce voluminous mailings on a routine basis. As such, mailings are often performed at various locations to reduce the load on any given location and to be closer to the destination of the mailings.

Unfortunately, monitoring and controlling remotely-located high volume mailing systems with existing control systems may be difficult. Existing control systems may not readily facilitate monitoring multiple remotely-located mailing systems from a central location. Furthermore, existing control systems may not readily facilitate monitoring various operating performance indicators of individual mail inserter devices within multiple remotely-located mailing systems.

DISCLOSURE OF THE INVENTION

It is therefore an object of the present invention to facilitate the monitoring of remotely-located high volume mailing systems from a central location.

It is another object of the present invention to facilitate the monitoring of various operating performance indicators of individual mail inserter devices within multiple remotely-located mailing systems.

Further objects of the invention will become apparent to those skilled in the art with reference to the accompanying figures and written description below.

In accordance with the present invention, systems, methods, and computer program products for managing and controlling, from a central location, a plurality of remotely situated mail processing devices are provided. Operation related information is displayed pertaining to each of said plurality of remotely situated mail processing devices such as, for instance, a mail insertion machine. Each mail insertion machine is represented on a computer visual display as an interactive icon. Visible indicia are associated with each icon for conveying, in real time, operational status information pertaining to the mail inserting machine represented by the icon.

The indicia associated with the mail insertion machine icons change appearance in response to a change in the certain operation related information received from a respective mail insertion machine. The indicia can be displayed as a color selected from a plurality of colors, wherein each color represents a respective operational condition or status of the mail insertion machine. Each interactive mail insertion machine site is displayable as an icon in a manner depicting the geographical location of each mail insertion device as it relates to a larger area, such as, for instance, the continental United States, or South America. Interactive icons may be, inter alia, added, deleted, and their location and appearance on the display can be modified.

One embodiment of the present invention describes a system for remotely managing a plurality of remote mail processing devices. The system comprises receiving means for receiving operation related information from each of the remote mail processing devices. The system also includes monitoring means for remotely monitoring operation related information from each of the remote mail processing devices operatively connected to the receiving means.

According to another aspect of the present invention, each interactive icon is responsive to user actions for displaying selective operation related information about a respective mail insertion device. Each interactive icon accepts user selections via an input device. When the user activates an interactive icon, various operational information about the mail insertion device represented by the icon is displayed. This operational information may include machine status, fault information, and various other types of information related to the operation and performance of the mail insertion device. Information about the operator of the mail insertion device may also be available.

The present invention is advantageous because users can be provided with the ability to monitor multiple mail insertion systems from a single location not necessarily proximate to the machines being monitored. Furthermore, the various stages of the insertion process can be monitored in real time. The present invention can facilitate managing automated mail processing systems to increase productivity and decrease costs associated with insertion. The present invention is also advantageous because a list of mail processing device operators can be created, modified, and sent out from a central location.

BRIEF DESCRIPTION OF THE DRAWINGS

The foregoing advantages and features of the present invention will be appreciated more fully from the following description with reference to the accompanying drawings in which:

FIG. 13 of the drawings illustrates a pop-up screen for selecting a language for text to be displayed in;

Figure 14:
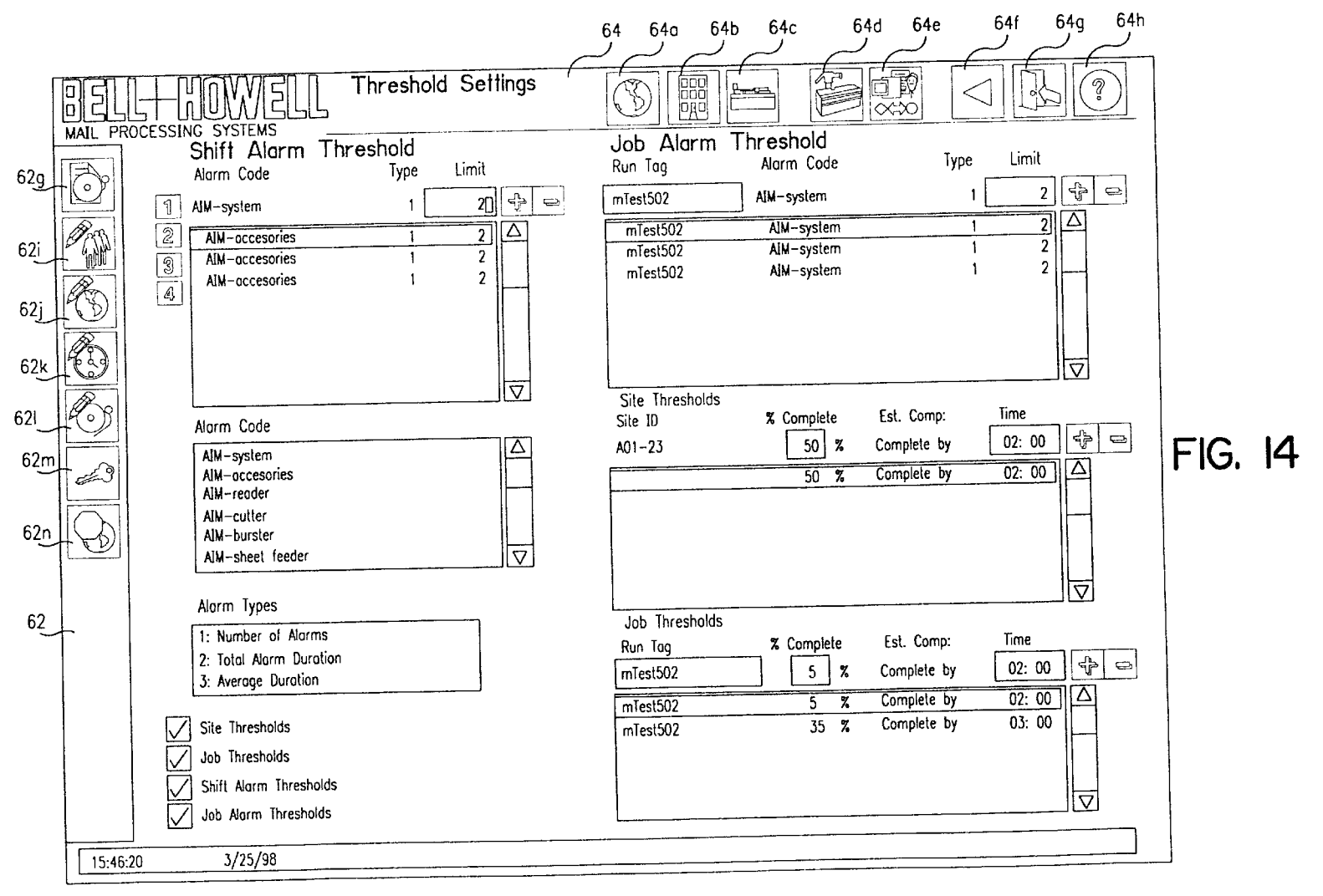

FIG. 14 of the drawings illustrates a Threshold Setting screen according to the present invention;

BEST MODE FOR CARRYING OUT THE INVENTION

Figure 1:
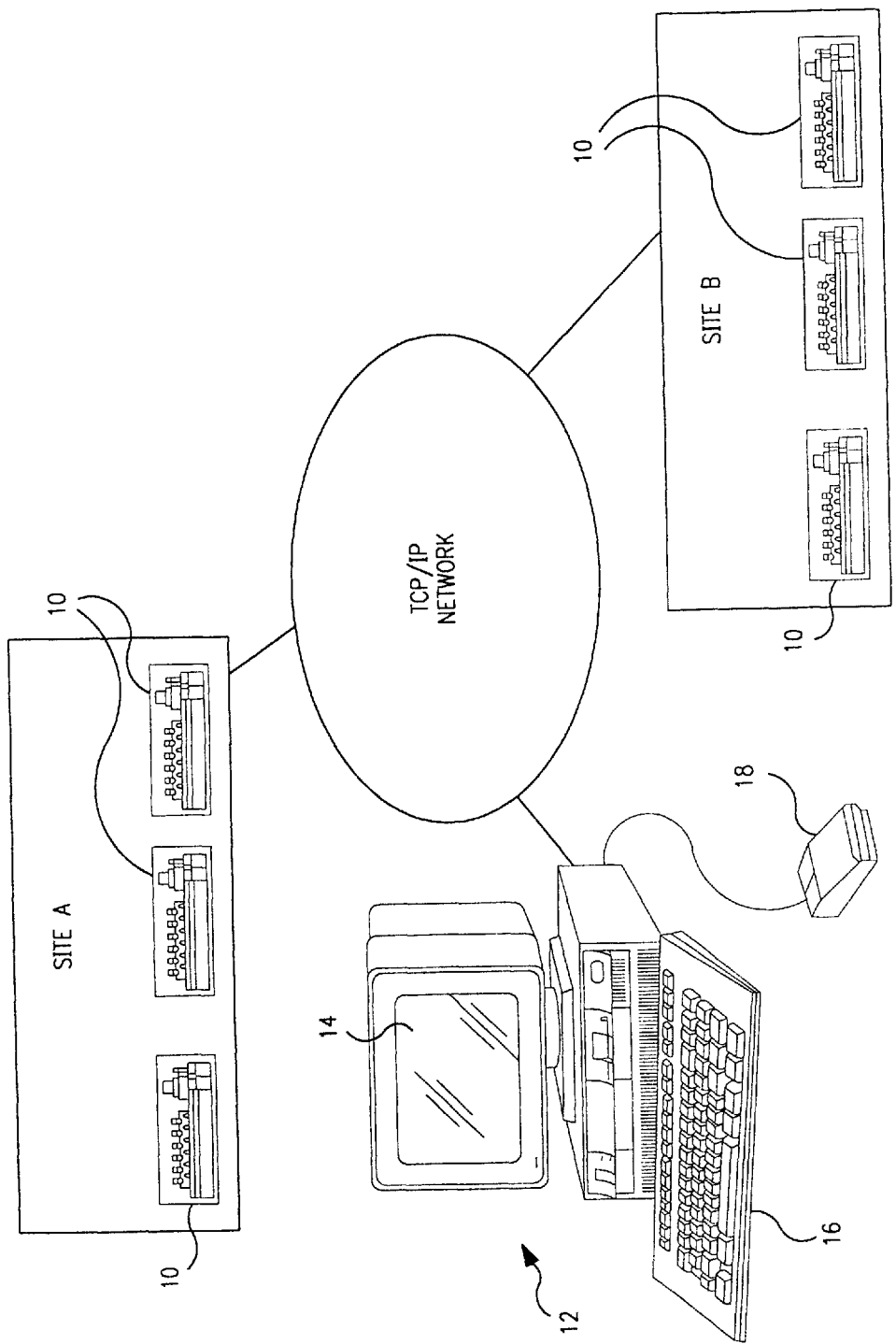
FIG. 1 of the drawings is a schematic diagram of a system for monitoring multiple mail processing systems, in accordance with the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

The present invention is described below with reference to flowchart illustrations of methods, apparatus (systems) and computer program products according to the invention. It will be understood that each block of the flowchart illustrations, and combinations of blocks in the flowchart illustrations, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

As will readily be appreciated by those skilled in the art, mail processing systems can encompass several types of remote and/or local mail processing machines, including, but not limited to, mail insertion machines and mail sorting machines. In a conventional mail processing system, mail inserting machines (also referred to hereinafter as insertion machines or insertion devices) are utilized for stuffing inserts into awaiting envelopes. Thereafter, the stuffed envelopes are sealed and various other operations associated with mail processing are performed. Insertion machines typically operate at high speeds and can often stuff ten thousand (10,000) envelopes or more per hour. An exemplary insertion machine is described in Applicants' issued U.S. Pat. No. 4,798,040 to Haas et al., the disclosure of which is incorporated herein by reference.

Referring now to FIG. 1, a schematic diagram of multiple mail insertion machines monitored and controlled by computer systems, methods and computer program products, in accordance with the present invention, is illustrated. Sites A and B each have one or more mail insertion machines 10 and are monitored and controlled via the present invention operating on computer system 12. Computer system 12 includes a display 14 for visually displaying information to a computer user, a central processing unit (CPU) and internal memory. Keyboard 16 and mouse 18 allow the user to provide input to the central processing unit. With the mouse 18, the user may move a pointer on the display 14 to an area displaying an object. By pressing and releasing a button on the mouse 18 while the pointer is in the area displaying the object or icon, the user "activates" the icon. This is also referred to hereinafter as "clicking on" an icon. Computer system 12, serves as data processing means for transmitting and receiving information from and to each mail insertion machine 10 and displaying same via display 14. Other computing systems, including mainframe computing systems, may be utilized to facilitate communicating with the various mail processing devices being monitored and controlled.

The present invention may be stored in computer system 12, either within internal memory or on internal disk storage. The present invention may also be stored on computer readable media and used therefrom by computer system 12. As will be described in detail below, the present invention alters the operation of computer system 12, allowing it to monitor and control a plurality of mail insertion devices in real time.

Figure 2:
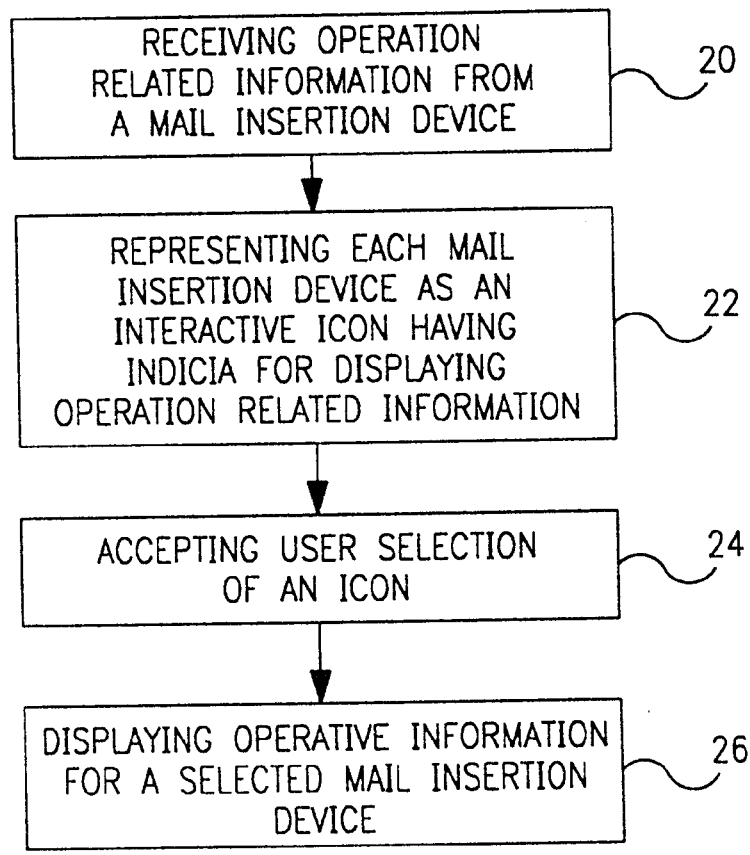
FIG. 2 of the drawings schematically illustrates, in block diagram form, operations for managing a plurality of mail insertion devices, according to the present invention.

Referring now to the block diagram of FIG. 2, operations for managing a plurality of mail insertion devices, according to one aspect of the present invention, are illustrated. Operations include receiving operation related information from mail insertion devices (Block 20); representing each of the mail insertion devices as an interactive icon having indicia for displaying operation related information for a respective mail insertion device (Block 22); accepting selection of an interactive icon (Block 24); and displaying operating status for the selected mail insertion device (Block 26).

Operation related information includes, but is not limited to, organizational, site, machine, utility, and system administration information. Organizational information comprises site addition, deletion, and modification capability as well as instantaneous production and goal data. Site information comprises instantaneous production and goal data, job data, fault data, and alarm data with respect to a particular site. Machine information comprises instantaneous production and goal data, job data, fault data, and alarm data with respect to a particular machine. Utility information comprises alarm data, user administration data, shift data, language data, threshold setting data, and run-time manager data. System administration information comprises report data, remote machine setup data, backup and restore data, and run tag editor data.

It is to be understood that a user does not necessarily have to select an icon to view information about a particular mail insertion device. Various information relating to a mail insertion device may be automatically updated and displayed. The operations illustrated in FIG. 2 may be performed in the various "views" described in detail below using FIGS. 4–18.

Figure 3:
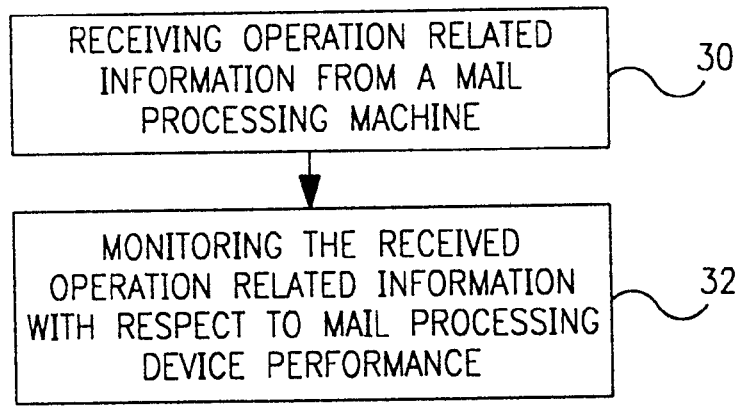
FIG. 3 of the drawings schematically illustrates, in block diagram form, operations for controlling a plurality of mail insertion devices, according to the present invention.

Referring now to FIG. 3, operations for controlling a plurality of mail insertion devices, according to one aspect of the present invention, are illustrated. Operations include receiving operation related information from mail processing devices (Block 30); and monitoring the received operation related information with respect to mail processing device performance (Block 32).

Figure 4:
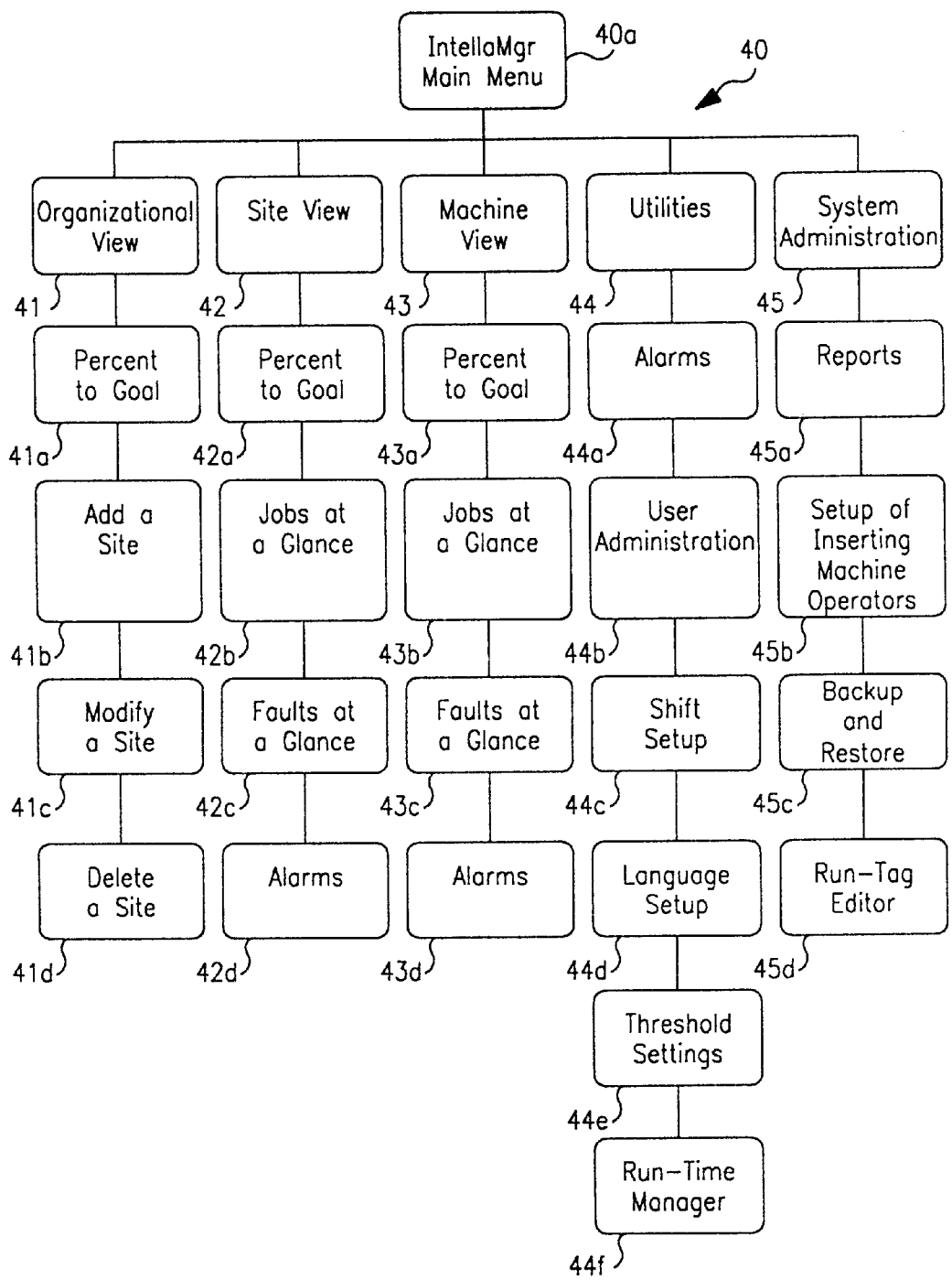
FIG. 4 of the drawings schematically illustrates a hierarchical arrangement of computer screens for managing a plurality of mail insertion devices, according to the present invention.

Referring now to FIG. 4, a hierarchical arrangement 40 of computer screens for facilitating management of a plurality of mail insertion devices, according to the present invention, is illustrated. From a main menu 40a presented to the user on a computer display, the user may select an "Organizational View" 41 of multiple sites having mail insertion machines, a "Site View" 42 of individual sites having mail insertion machines, a "Machine View" 43 of individual insertion machines at a particular site; a "Utilities" 44 selection comprising several options; and a "System Administration" 45 selection comprising several options.

Various screens containing operating information are available from each of the respective Organizational View 41, Site View 42, and Machine View 43 screens. For example, the user may access the "Percent to Goal" screen 41a, and the "Add" 41b, "Modify" 41c, or "Delete" 41d settings screens from the Organizational View screen 41. The user may access the "Percent to Goal" screen 42a, the "Jobs at a Glance" screen 42b, the "Faults at a Glance" screen 42c, and the "Alarms" screen 42d from the Site View Screen 42. The user may access the "Percent to Goal" screen 43a, the "Jobs at a Glance" screen 43b, the "Faults at a Glance" screen 43c, and the "Alarms" screen 43d from the Machine View Screen 43. Each of these screens, and the information presented thereby, are described in detail below.

The user may select (i.e., run) various utility programs via screens accessible via the "Utilities" screen 44 such as the "Alarms" screen 44a, the "User Administration" screen 44b, the "Shift Setup" screen 44c, the "Language Setup" screen 44d, the "Threshold Settings" screen 44e, and the "Run-Time Manager" screen 44f. In addition, the user may perform various administrative tasks via the "Systems Administration" screen 45 such as the "Reports" screen 45a, the "Setup of Inserting Machine Operators" screen 45b, the "Backup/Restore" screen 45c, and the "Run-Tag Editor" screen 45d. Each of these screens, and the information presented thereby, are described in detail below.

Logo Screen and Log-In

Figure 5:
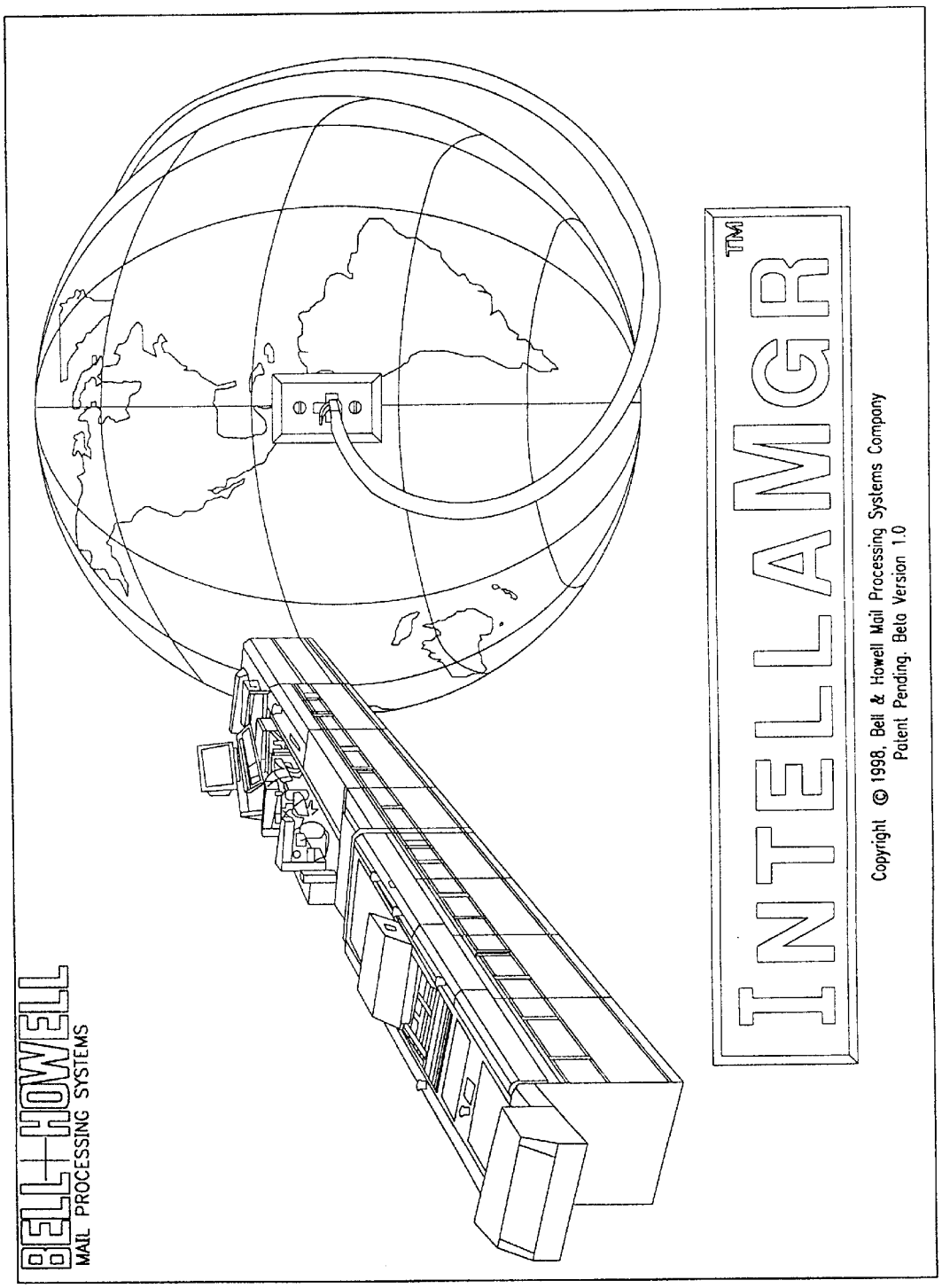
FIG. 5 of the drawings illustrates a startup screen presented to the user upon startup of the present invention.

The initial screen on the user's display, when the present invention is initiated on a computer, is preferably a logo or start-up screen 50 such as that illustrated in FIG. 5. Clicking at any point on the start-up screen 50 preferably activates a login procedure via a pop-up screen. For security reasons, it is required that the user enter a user name and password in order to proceed. As would be understood by those having skill in the art, options available to a user upon login may depend on permissions assigned to the particular user.

Once properly logged in, the present invention allows users to view various operational and performance information about multiple remotely-located mail insertion machines. Users are presented with a hierarchy of views depicting organizational, site, and machine-specific perspectives of their mail insertion machines. The user can display text throughout the various screens in a variety of languages including, but not limited to, English, Spanish, French, Italian, German and Dutch. Preferably, a language can be selected via a pop-up screen such as that illustrated in FIG. 13. Each hierarchical view will be described below in detail.

Each view screen, organizational, site and machine, also presents the user with various toolbars containing icons for performing various functions. In the embodiment of the Organizational View Screen illustrated in FIG. 6, two toolbars 62 and 64 are presented to the user. Each toolbar contains icons for performing specific functions. Preferably, toolbars 62 and 64 are presented to the user with the same configuration in all views in order to maintain a consistent and easy to use interface. It is understood, however, that certain functions may not be executable from certain screens. In this case, the icons representing those functions are shaded or greyed out indicating they are not a valid selection or operation from the present screen.

Table 1 below describes the function of each of the icons contained within toolbar 62.

TABLE 1

| Icon # | Icon Name | Icon Function |
|---|---|---|
| 62a | Add (Site/Machine) | Add a site or a machine. |
| 62b | Edit (Site/Machine) | Edit a selected site or machine. |
| 62c | Delete (Site/Machine) | Delete a selected site or machine. |

TABLE 1-continued

| Icon # | Icon Name | Icon Function |
|---|---|---|
| 62d | Percent to Goal | Access the Percent to Goal panel. |
| 62e | Job at a Glance | Access the Job at a Glance panel. |
| 62f | Faults at a Glance | Access the Faults at a Glance panel. |
| 62g | Alarms | Access the Alarms panel. |
| 62h | Text | Toggle between a graphic and text display. |
| 62i | User Administration | Access the User Administration panel. |
| 62j | Site Settings | Access the Site Settings panel. |
| 62k | Shift Settings | Access the Shift Settings panel. |
| 62l | Threshold Settings | Access the Threshold Settings panel. |
| 62m | Run Manager | Access the Run Manager panel. |
| 62n | Shut-down Application | Shut-down the current application. |

Table 2 below describes the function of each of the icons contained within toolbar 64.

TABLE 2

| Icon # | Icon Name | Icon Function |
|---|---|---|
| 64a | Organizational View | Display all sites currently configured. |
| 64b | Site View | Display the site settings for a selected site. |
| 64c | Machine View | Display all the machines defined at a particular site. |
| 64d | Utilities | Display the Alarms panel. Access other Utilities. |
| 64e | System Administration | Access various system administration tasks. |
| 64f | Back | Return to the previous panel. |
| 64g | Log off | Log out and return to main panel. |
| 64h | Help | Access help panels. |

It is understood that additional graphic designs may be utilized for each icon without departing from the spirit and intent of the present invention.

Organizational View

Figure 6:
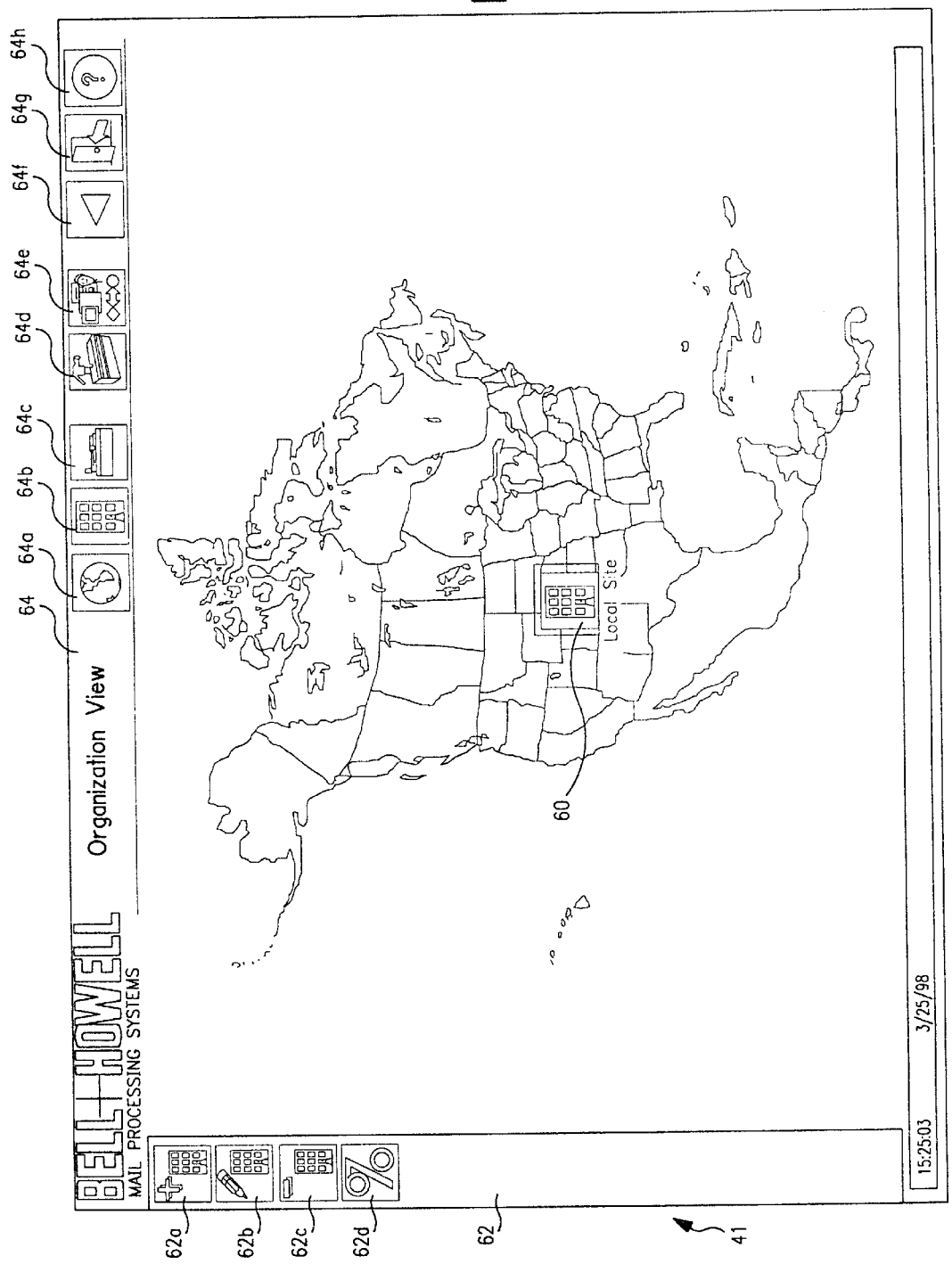
FIG. 6 of the drawings illustrates an Organizational View screen according to the present invention.

The Organizational View screen 41, illustrated in FIG. 6, preferably includes a geographical background on which the user can place up to twelve (12) sites having mail insertion machines in a geographically oriented arrangement. Although the illustrated embodiment depicts North America as the background, it is to be understood that any geographical depiction is possible using the present invention. Furthermore, no geographical background may be presented if so desired by the user. In the case where users do not have multiple sites, the organizational view can be deactivated and removed from the screen hierarchy.

The Organizational View screen 41 allows the user to display site icons 60 for each site having mail insertion machines. The user will be able to activate site icons 60 and be advanced to "Site View" for the respective site, as described in detail below.

The user can add, delete and modify information associated with each site by "clicking on" or otherwise activating the respective site icon 60 and then clicking on or otherwise activating the respective add, edit, or delete icons 62a, 62b, 62c. If the user is modifying a site, a pop-up window with the selected site's information appears on the screen for editing when icon 62b is activated. If the user is deleting a site, the site icon will simply disappear from the screen when icon 62c is activated. To add a site, the user activates icon 62a and a pop-up window, designed to receive input from the user, appears on the screen.

Site View

Figure 7:
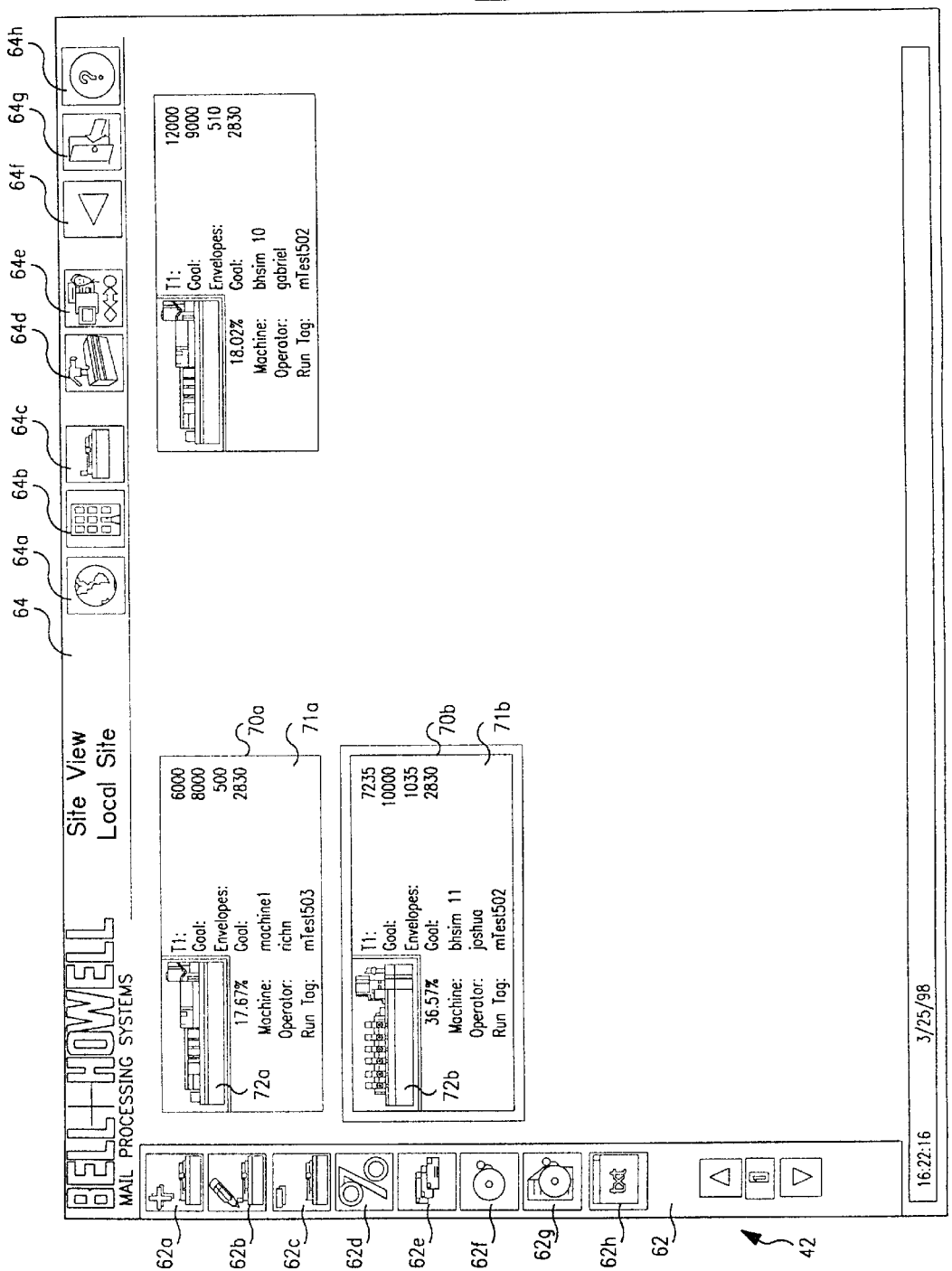
FIG. 7 of the drawings illustrates a Site View screen according to the present invention.

Preferably, when the user "clicks on" or otherwise activates a site icon, a Site View screen is presented to the user for the site represented by the activated icon. A Site View screen displays the location of mail insertion machines at a selected site via machine icons. An exemplary Site View screen 42 is illustrated in FIG. 7, wherein two insertion machines are represented by machine icons 70a and 70b. Preferably a maximum of twelve (12) mail insertion machines are displayed per Site View screen 42, not to exceed a total of one hundred (100) machines.

For each mail insertion machine at a site, the following information is preferably available via a respective machine icon: machine status, actual and goal throughput, actual and goal envelope counts, percent completion for the current run, the current operator identification, and the current job identification. Preferably, all mail insertion machine information is available and displayable in real time. It is understood that the term "real time" shall mean a minimal refresh rate of any screen of 30 seconds or less.

The operational status or condition of a particular mail insertion machine is discernable at all times by the color of indicia surrounding each machine icon. Accordingly, the user does not have to activate the machine icon to determine the operational status of a respective mail insertion machine. As illustrated in FIG. 7, each machine icon 70a, 70b has an area of indicia 71a, 71b immediately surrounding the graphic portion 72a, 72b of each machine icon that changes colors depending on the operating conditions of the particular insertion machine. Exemplary operating conditions and their respective colors are presented in Table 3 below.

TABLE 3

| Insertion Machine Operating Condition | Color Surrounding Machine Icon |
|---|---|
| Off | Background Color |
| Stopped | Grey |
| Running/Run Pending | Green |
| Jogging/Jog Pending | Yellow |
| Faulted/Insertion Machine Communications Failure | Red |
| Hold/Track Hold | Orange |
| Operator Break | Pink |
| Service | White |

The present invention is not limited to color as a visual indication of insertion machine operational status. Operational status can be indicated by other visual schemes which change the display of an icon in response to actual machine operational condition changes. Machine status information available from Site View includes, but is not limited to, actual and goal throughput, actual and goal envelope counts, the percent complete for a current run, the current operator identification, and the current job identification number. The information that is displayed is the current information for the inserting machine and shows the progress being made on the job that is currently running on that machine.

Users in Site View can also arrange a series of machine icons to represent the physical layout of mail insertion machines. Icons can represent the type of insertion machine and indicate the type of communication protocols being utilized. The user can add, modify, and delete insertion machine icons at each site. When adding an insertion machine, the user is prompted for the following information: type of insertion machine, machine identification, machine name, and various network parameters.

Machine View

Figure 8:
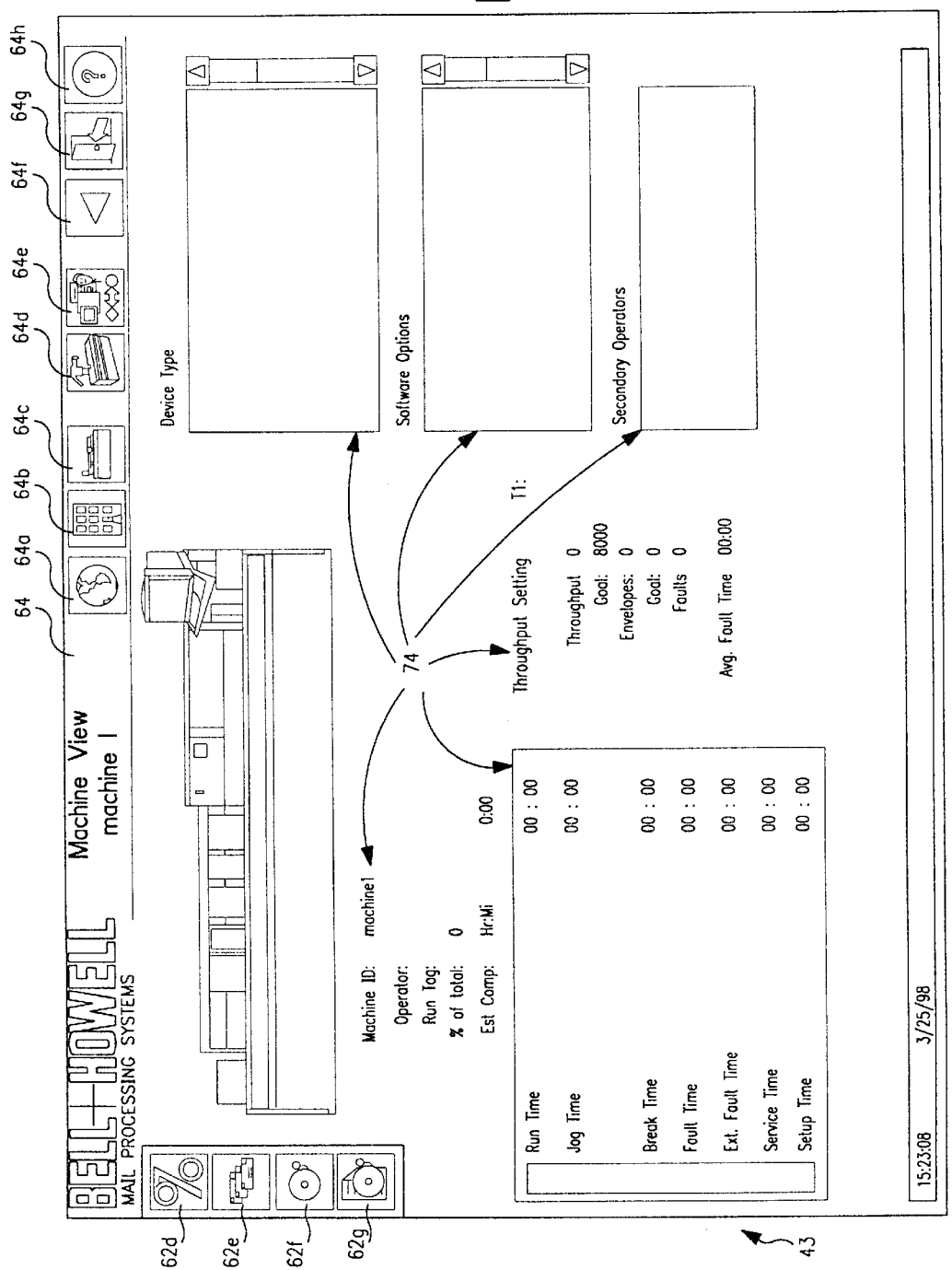
FIG. 8 of the drawings illustrates a Machine View screen according to the present invention.

When the user double clicks or otherwise activates an interactive machine icon in the Site View screen of FIG. 7 the Machine View screen 43 of FIG. 8 is presented for the mail insertion machine represented by that machine icon. Using the Machine View screen 43, the user is able to view various operational information 74 including, but not limited to, the following: machine status, actual and goal throughput, actual and goal envelope counts, estimated time to completion, the currently running job identification, the current fault count, the average fault length, a bar graph of time usage, device information, software package information and operator information. In addition, the user will be able to view the current T1, T2 or T3 formula results for each machine. As is known to those with skill in the art, for Advanced User Interface (AUI) type insertion machines (manufactured by Bell & Howell Mail Processing Systems, Allentown, Pa., and Durham, N.C.), T1 is defined as a throughput calculation of "envelopes per hour" and is calculated using the following equation:

$$(\text{run envelopes}/(\text{run time}+\text{fault time}))*3600$$

T2 is defined as a calculation of "percent utilization" and is calculated using the following equation:

$$(\text{total envelopes}*100)/(\text{theoretical throughput})$$

For both T1 and T2, the following definitions apply:

$$\text{total envelopes}=\text{run envelopes}+\text{jog envelopes}$$

$$\text{theoretical throughput}=(\text{average run speed}*(\text{run time}+\text{jog time}+\text{fault time}))/3600$$

$$\text{average run speed}=\text{run machine cycles}/(\text{run time}/3600)$$

For Inserting System Machine Connection (ISMC) insertion machines (manufactured by Bell & Howell Mail Processing Systems) T1 is defined as follows:

$$T1=((\text{total envelopes}-\text{service envelopes})*3600)/(\text{run time}+\text{fault time})$$

As is known by those skilled in the art, T2 is not calculated for ISMC insertion machines because the ISMC interface generally does not supply machine cycle information.

For both types of insertion machines, T3 is a user-defined formula, and can be configured in Site Settings for each site. The numerator is "run envelopes" and the denominator may be a sum of user selected time measurements. The user may select any or all of the following time measurements to be included in the denominator: run time, jog time, fault time, extended fault time, break time, service time, idle time, or suspend time. An exemplary T3 calculation is:

$$(\text{run envelopes}/(\text{run time}+\text{jog time}+\text{break time}))*3600$$

Remote Site Connectivity

The user can view other site information by going to the Organizational View of FIG. 6 and selecting another site's icon 64b. The other site icon must have been previously configured in order to be present on the screen. Once the user has selected a remote site icon 64b, the Site View, Machine View, "Percent to Goal" pop-up, "Job at a Glance" pop-up and "Faults at a Glance" pop-up will now display information from the remote site. The user is prohibited from changing setup information for the remote site. For instance, the user can not change thresholds or run tag goals for the remote site.

Other Screens and Windows

The following screens and pop-up windows are presented to the user when the user activates certain icons and/or automatically when certain events occur.

"Faults at a Glance" Pop-Up

Icons for providing fault and job information are preferably provided in both Machine View and Site View. The user can select this pop-up window (not shown) by clicking on the "Faults at a Glance" button 62f on the left side of the Site View screen of FIG. 7 or the Machine View screen of FIG. 8.

"Percent to Goal" Pop-Up

Figure 9:
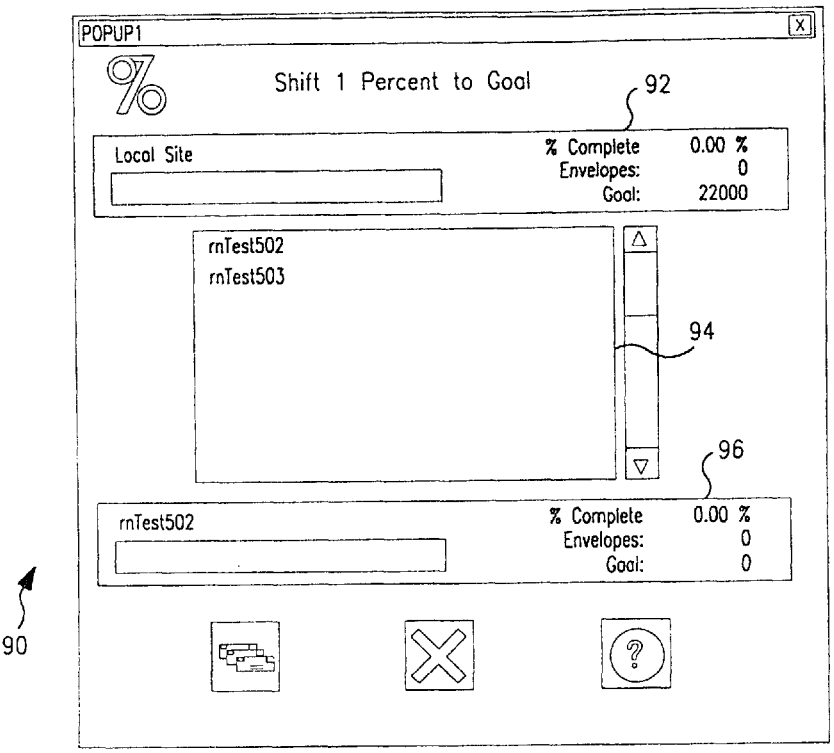
FIG. 9 of the drawings illustrates a Percent to Goal screen according to the present invention.

A Percent to Goal pop-up window 90, illustrated in FIG. 9, appears when the user clicks on the "%" icon 62d in either Machine View of FIG. 8 or Site View of FIG. 7. The Percent to Goal pop-up permits the user to view current statistics. The top portion 92 displays all information pertaining to an entire site. Statistics for jobs currently running or completed during the current shift on the insertion machines at the site may be included in the top portion 92. A list 94 of jobs allows the user to select a job and view a summary of the selected job in the bottom portion 96 of the window 90.

"Job at a Glance" Pop-Up

Figure 10:
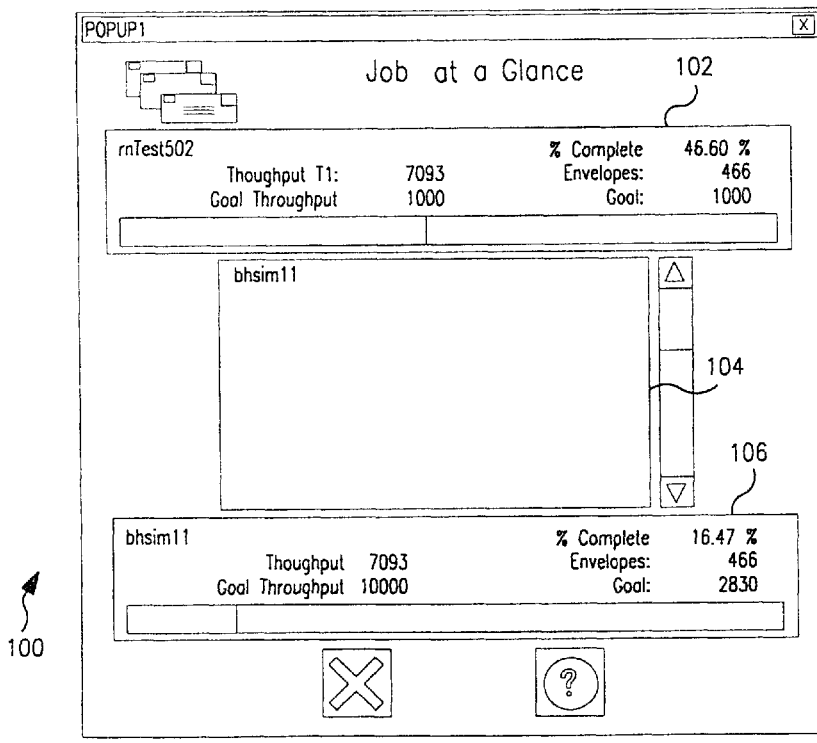
FIG. 10 of the drawings illustrates a Job at a Glance screen according to the present invention.

A Job at a Glance pop-up window 100, illustrated in FIG. 10, appears when the user clicks on the "Job at a Glance" button 62e on the side of various screens. The top section 102 shows a summary of all elements of a job. The list 104 in the center portion of the window 100 contains all insertion machines running that particular job. When the user selects one of those insertion machines, details about the selected insertion machine will appear in the bottom section 106. Preferred information displayed in the bottom section 106 includes, but is not limited to: machine identification, operators running machine(s), current throughput, goal throughput, current accounts completed, and total accounts in job.

User Administration

Figure 11:
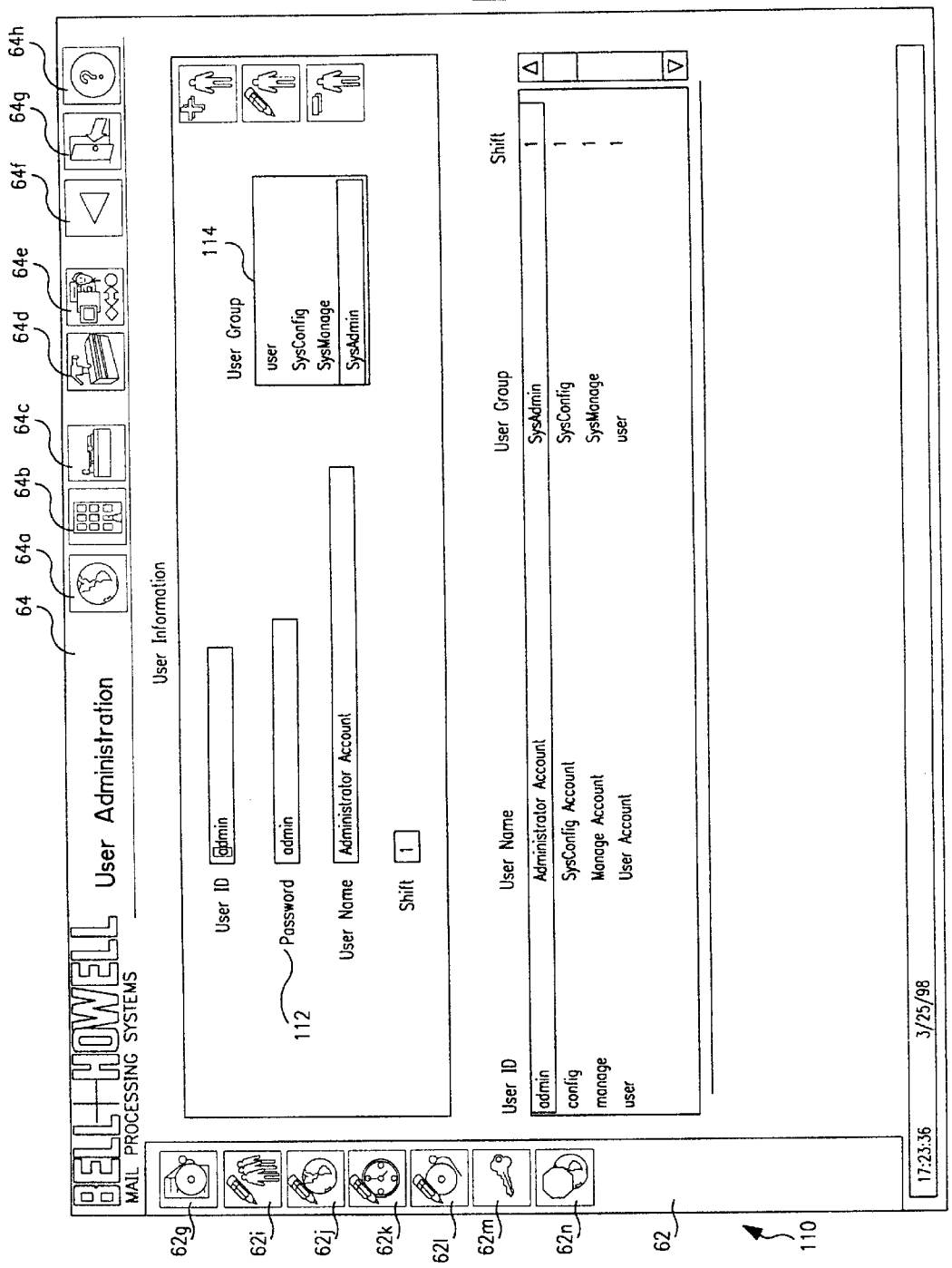
FIG. 11 of the drawings illustrates a User Administration screen according to the present invention.

The User Administration utility screen 110, illustrated in FIG. 11, allows the user to add, edit, and delete users, including changing the security group of which the user is a member. In the illustrated embodiment, the top left portion 112 of the screen 110 is used to configure a user's account. In the illustrated embodiment, the top right portion 114 of the screen 110 is used to configure security groups of users. Each security group preferably has a name and a set of designated privileges. The types of privileges include: status view, operator view, reports, alarm view, file transfer, edit configuration, job programming, maintain system, and edit users.

System Management and Utilities

Figure 12:
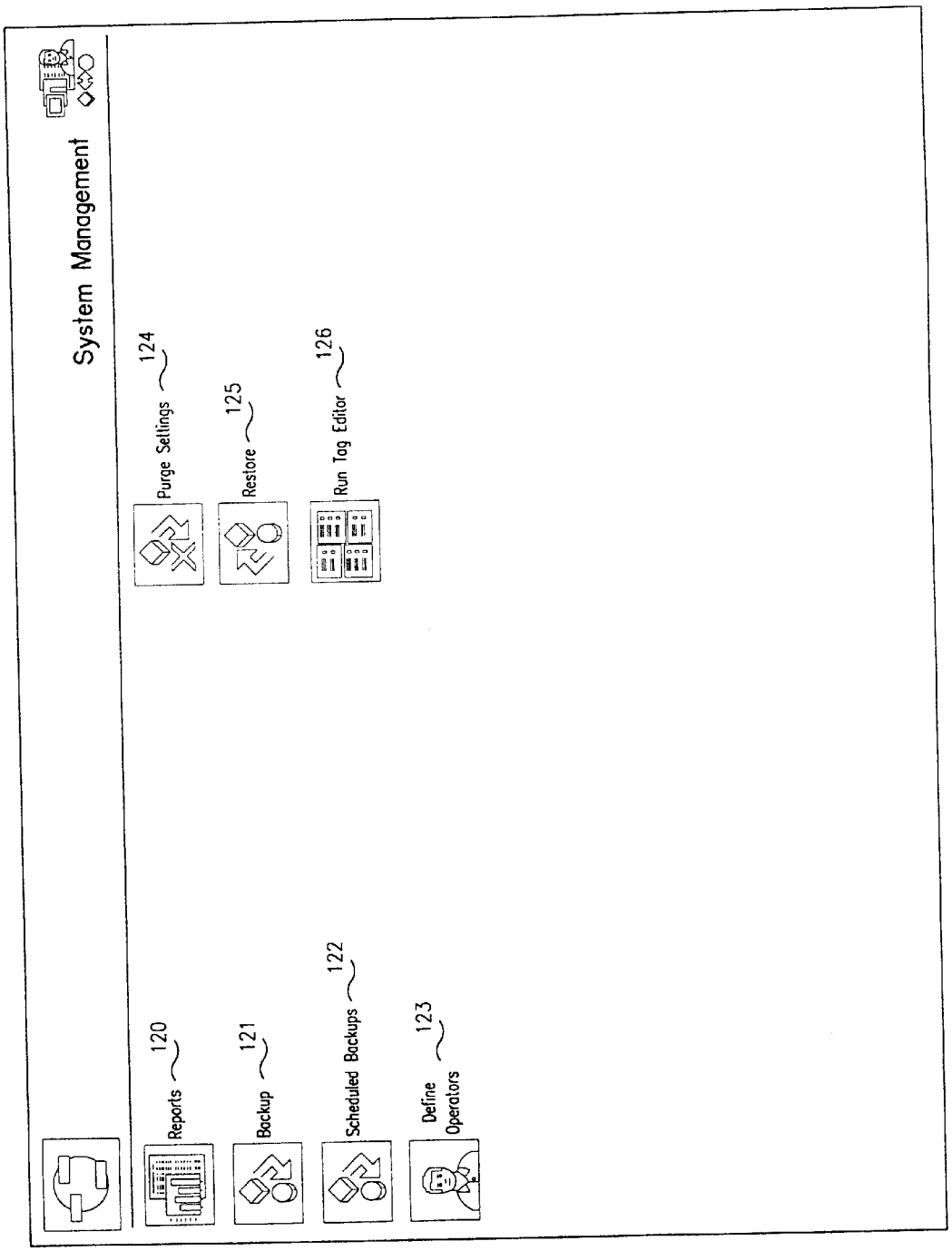
FIG. 12 of the drawings illustrates a System Management screen according to the present invention.
Figure 13:
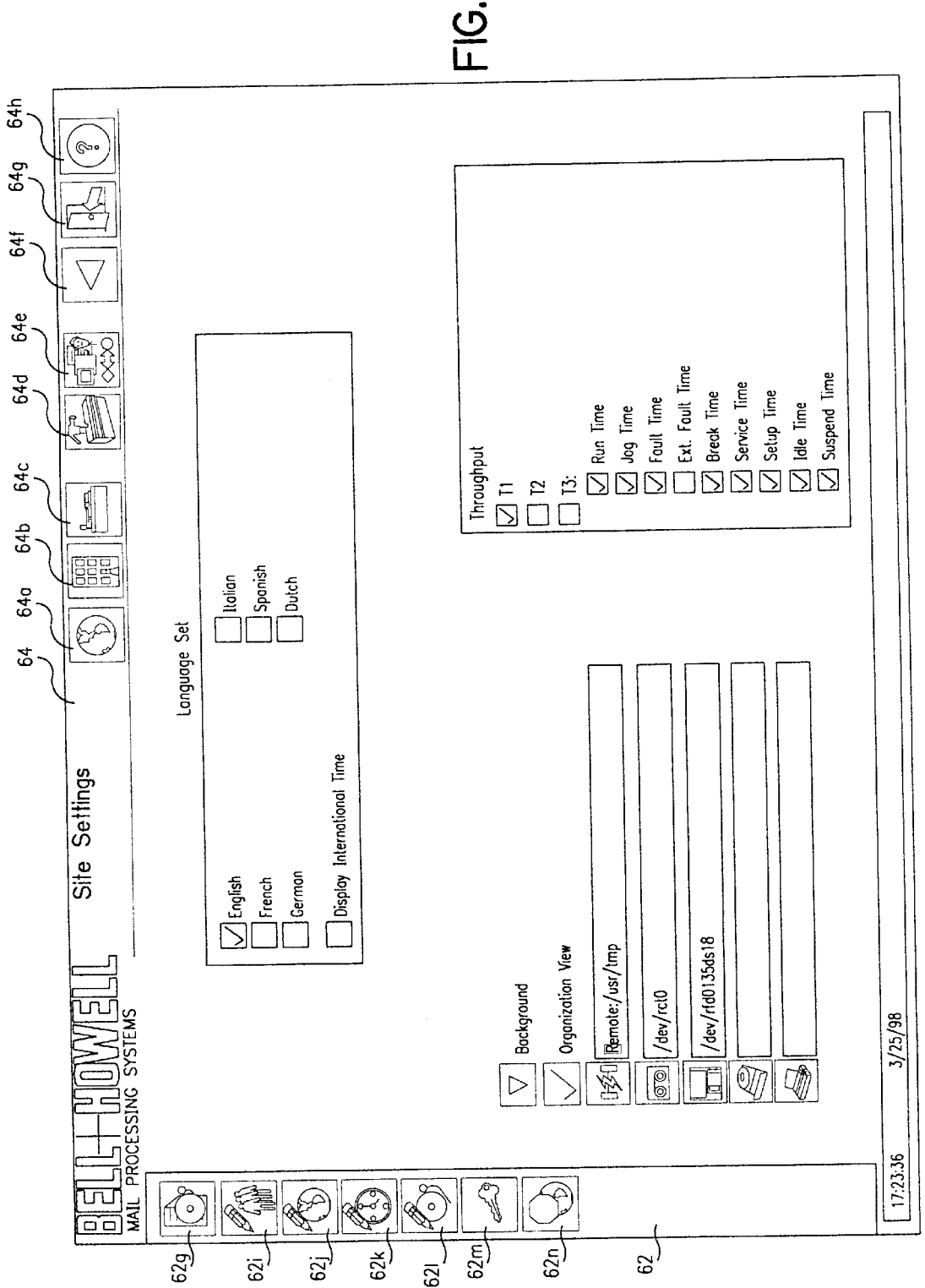
Figure 15:
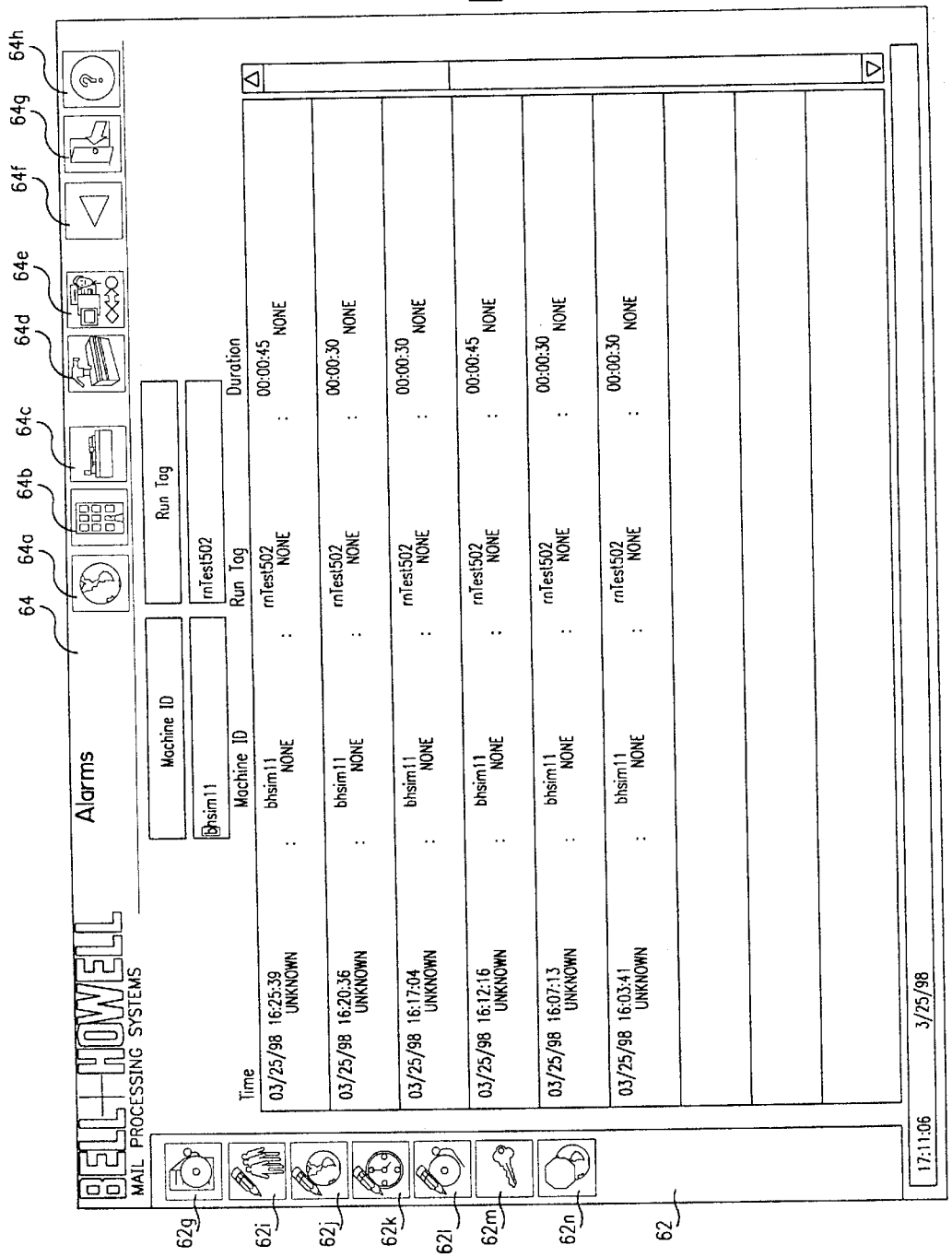
FIG. 15 of the drawings illustrates a pop-up screen for Alarm Status.

FIG. 12 illustrates the "System Management" screen in which the user is provided with various system management tools including report generation 120, data backup 121, scheduled data backup 122, operator setup 123, purge settings 124, data restore 125, and run tag editor 126. Various utilities may also be provided for performing a variety of functions including configuring user accounts, changing the display language, and configuring shift setups. The user can view individual occurrences of alarms from the mail insertion machines as well as set alarm thresholds for specific jobs. Alarm messages preferably can be filtered either by job identification, insertion machine identification or both.

Thresholds are a significant feature of the present invention. Thresholds allow the user to pro-actively monitor the progress of inserting machines and take corrective actions if necessary. There are two different types of thresholds. The first type is alarm thresholds. Alarm thresholds (FIG. 14) are based on occurrences of errors within a particular inserting machine. The second type is production thresholds. Production thresholds are based on the progress of completed envelopes compared to the expected goal of completed envelopes for a particular job.

Alarm Thresholds

The user may set either Shift or Run tag thresholds (FIG. 15) of three (3) different types: number of alarm occurrences, total duration of the alarms, or average duration of the alarms. The user may select to apply the threshold to a group of alarms for a shift or for a specific run tag. When an inserting machine crosses the threshold, the user is alerted with a pop-up which displays the violated threshold.

Example:

For Shift 1, a threshold is set for five occurrences of "AIM—reader" errors. If an inserting machine exhibits five of these errors, the user is alerted via an alert pop-up. Once the alert pop-up is dismissed, the count is re-initialized to zero and the threshold monitoring is resumed.

In addition, a pop-up window is presented to the user for viewing occurrences of thresholds on groups of errors. Table 4 below illustrates some of the errors that may be monitored and logged.

TABLE 4

| General Error Type | Specific Error Type |
|---|---|
| Aim | System |
| Aim | Accessories |
| Aim | Reader |
| Aim | Cutter |
| Aim | Burster |
| Aim | Sheet Feeder |
| Aim | Turnover/Sequencer |
| Aim | Hold Module |
| Aim | Right Angle Turn |
| Aim | Accumulator |
| Aim | Diverter |
| Aim | Folder |
| Aim | Collector |
| Aim | Interface |
| Aim | Slitter |
| Aim | Other |
| Aim | All |
| Insert Feeder | System |
| Insert Feeder | Reader |
| Insert Feeder | Miss |
| Insert Feeder | Double |
| Insert Feeder | Other |
| Insert Feeder | All |
| Envelope Feeder | System |
| Envelope Feeder | Reader |
| Envelope Feeder | Miss |
| Envelope Feeder | Double |
| Envelope Feeder | Other |
| Envelope Feeder | All |
| Base Machine | — |
| Finishing | Turnover |
| Finishing | Sealer |
| Finishing | Bridge |
| Finishing | Other |
| Finishing | All |
| Delivery | Modular Delivery |
| Delivery | Postage Meter |
| Delivery | Printer |
| Delivery | Output Device |
| Delivery | Other |
| Delivery | All |

Preferably, a pop-up window automatically appears on the user's display when a threshold is crossed, in order to alert the user to the particular condition. Information that is preferably displayed in such a window includes: identification of insertion machine having an error, error type, number of occurrences of error, total errors, total time lost, and average reset time. Preferably, the item that caused the threshold to trigger the pop-up window will be highlighted. For example, if a threshold was set for an average reset time of two (2) minutes and the average reset time calculated equals three (3) minutes, the "Threshold Violation" pop-up window would appear on the user's display with the average reset time of three (3) minutes highlighted. If the user needs to see specific error occurrences, he/she can go to an Alarm Browser and filter the errors by machine identification or job identification.

It is understood that additional alarm thresholds may be utilized without departing from the spirit and intent of the present invention.

Production Thresholds

The user may set either Site or Run tag thresholds for production levels. The user selects a "percentage to be complete" and a time of day at which to check the threshold. When that time of day is reached, the system checks the threshold percentage against the actual percentage to see if the production threshold is met. If the actual production percentage is greater than or equal to the threshold percentage, the threshold is met. Otherwise, the production threshold is violated and an alert pop-up is displayed.

Example:

For a run tag of "job 17A", the machines should be 50% complete by 11:30 AM. At 11:30 AM the system checks to see if the machines are 50% to the goal. If the actual percentage is less than 50%, an alert pop-up is displayed.

In addition, a pop-up window is presented to the user for viewing occurrences of production threshold violations. Preferably, a pop-up window automatically appears on the user's display when a threshold is crossed, in order to alert the user to the particular condition. Information that is preferably displayed in such a window includes: identification of insertion machine having an error, error type, number of occurrences of error, total errors, total time lost, and average reset time. Preferably, the item that caused the threshold to trigger the pop-up window will be highlighted. For example, if a threshold was set for 50% job completion by 12:00 noon and only 45% was actually achieved at that time then a production threshold violation pop-up window would appear on the user's display showing the current percentage complete thereby giving the operator an indication of job performance.

It is understood that additional production thresholds may be utilized without departing from the spirit and intent of the present invention.

Run Tag Editor

Figure 16:
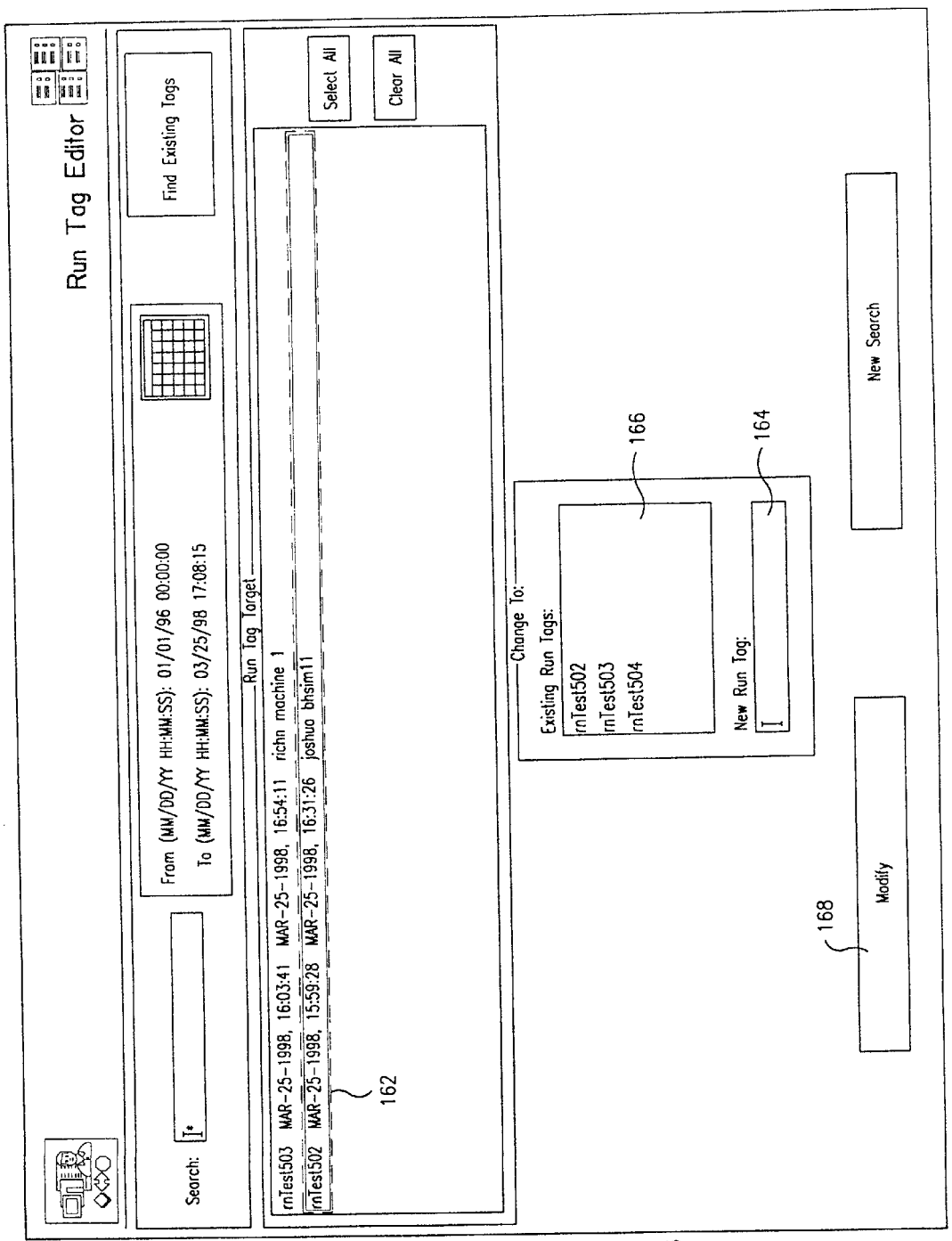
FIG. 16 of the drawings illustrates a Run Tag Editor screen according to the present invention.
Figure 17:
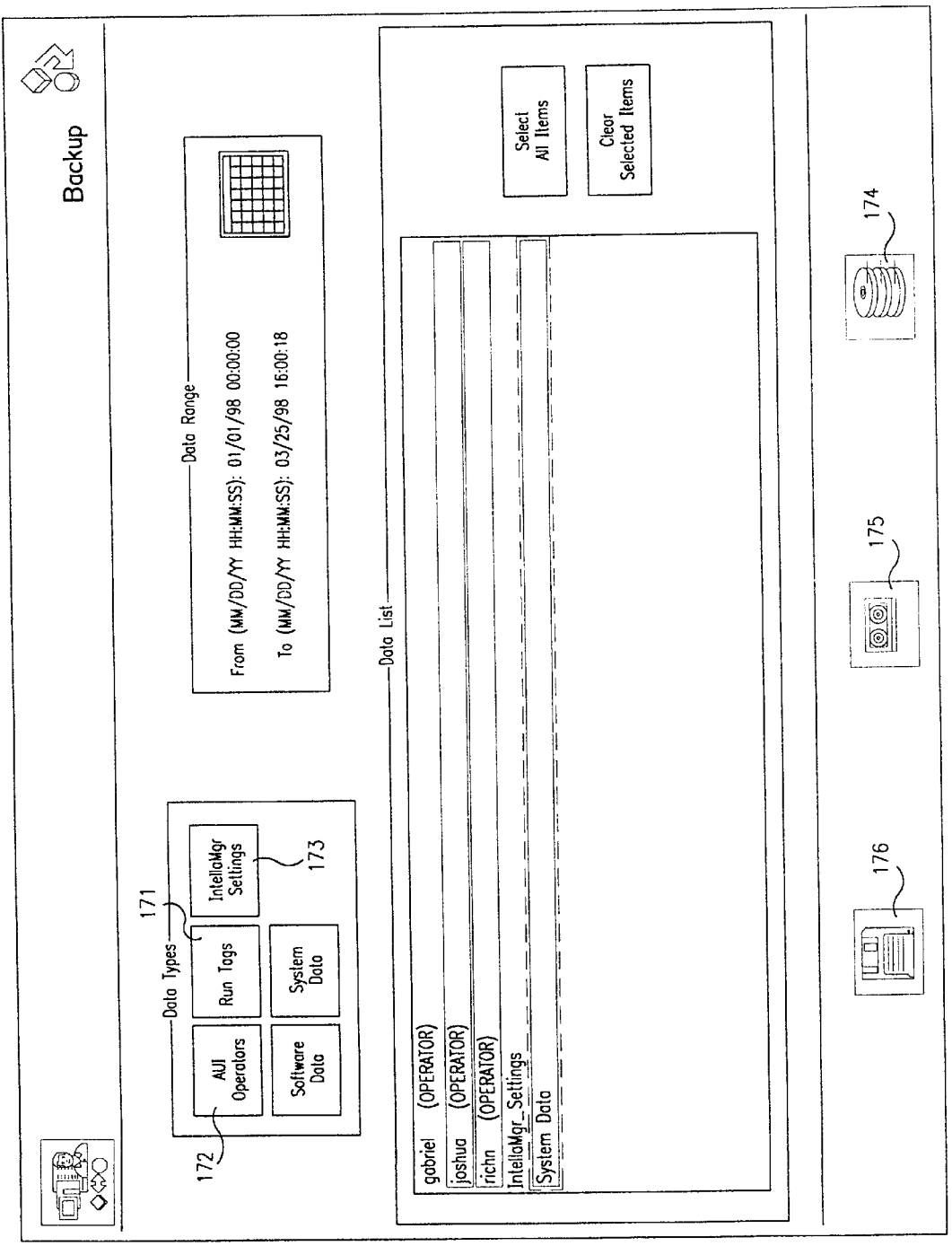
FIG. 17 of the drawings illustrates a Backup screen according to the present invention.

The "Run Tag Editor" screen of FIG. 16 is accessed via the "System Management" screen of FIG. 12. The Run Tag Editor is a utility that allows the user to correct any run tag assignment mistakes made by the inserting machine operator. Since data is labeled in the present invention by a run tag, it is important that the run tag be correct. Therefore, it is desirable for the user to be able to make corrections to run tags.

Within the Run Tag Editor screen 126, the user may search all of the run tags 162 in the database. The list includes run tags that have completed at least one run in the database. The user is prohibited from editing run tags for inserter runs that are in progress. Once the user has received the results of the run tag search, he may select one, many, or all run tags to edit. Upon selection, he will create a new run tag for the selected items either by typing a new tag 164 in the box provided on the screen or by selecting a previously used run tag from the list 166 above the box. He can then modify the tags by clicking the Modify button 168 located near the bottom of the screen. A pop-up will be presented to the user to show that the database will be altered and the user must confirm this. Then, after the database is altered, the search list will be updated. Any errors that occur during this process will be displayed on the screen.

Backup/Restore

The data backup and restore functionality is divided into three (3) separate screens and each is accessed via the "System Management" screen of FIG. 12. Such screens include the Backup screen (FIG. 17), the Restore screen 180 (FIG. 18), and the Scheduled Backup screen (not shown).

The user may choose to backup (FIG. 17) one, many, or all of the following data types: run tag information 171, operator setup information 172, or system configuration information 173. The user selects the data to be saved, selects the media (hard disk 174, tape 175 or floppy 176) and then executes the backup. Any errors that occur will be displayed on the screen.

Figure 18:
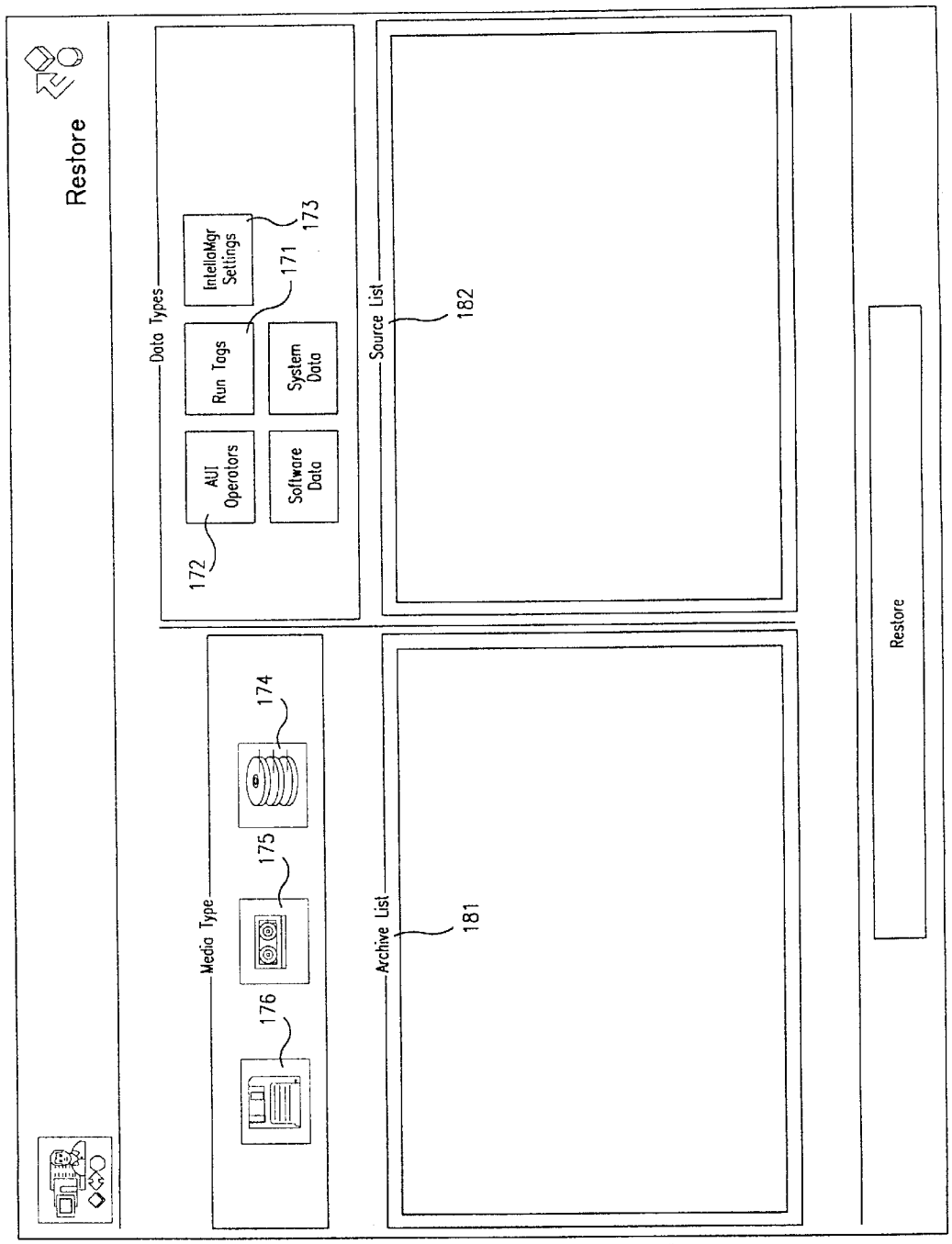
FIG. 18 of the drawings illustrates a Restore screen according to the present invention.

The user may choose the Restore screen 180 illustrated illustrated in FIG. 18 to restore any data type from a backup file. First, the user selects the restoration media (hard disk 174, tape 175 or floppy 176). The selected media is accessed in order to present an archive list 181 or source list 182 of restorable data to the user. The user can then select to restore one, many, or all of the data in the backup file. Any errors that occur will be displayed on the screen for the user.

The user will be able to choose to schedule a backup for future or repeated execution. The user will select the data types and the media just as he would for a regular backup. The user would then select the time and interval at which the backup will occur. After making these selections, the user will be able to schedule the backup. The backup would then execute at the appropriate time. The user will also be able to use this screen to remove a command for a scheduled backup. The list at the top of the screen will display all currently scheduled backup parameters and the user would select any of them for viewing or deletion. Any errors that would occur during the setting of backup parameters will be displayed to the user. Any errors that would occur during a scheduled backup will be written to a log file.

Figure 19:
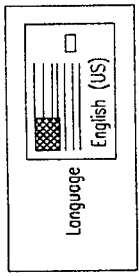
FIG. 19 of the drawings illustrates an Operator Definition screen according to the present invention.

A user can also define the valid list of operators for a given mail processing machine at a remote location. FIG. 19 illustrates the "Operator Definition" screen 123 selectable from the System Management screen of FIG. 12. The Operator Definition screen 123 allows a system level user to identify operators of particular mail processing machines and define the level of access and/or control the operator will have with respect to the mail processing machine. The user will enter a unique Operator ID 190, password 192, and optional description 194 in the dialog box 196 on the upper portion of the screen. Next, the user will choose and assign the authority levels for this operator using the dialog box 198 in the lower center portion of the screen. This information is then communicated from the central location over a computer network to the specific mail processing machine in question. This information can be stored such that it can not be edited from the remote mail processing machine.

Hardware and Software Requirements

The present invention can be implemented in a variety of communications environments including a Local Area Network (LAN) and Wide Area Network (WAN) environments. The present invention can be implemented in communications environments utilizing TCP/IP communications protocol, such as the Internet, and environments utilizing SNA protocol. Hardware for implementing the present invention is generally consistent with typical personal computing equipment, and does not generally require special environmental conditions other than a typical office environment. Preferably, the present invention is implemented on an International Business Machines (IBM®) or IBM®-compatible personal computer and software capable of supporting a thin wire Ethernet TCP/IP environment. Even more preferable is a server based on an Intel® 486 or Pentium® processor and having at least sixteen (16) megabytes of memory to perform all functions efficiently, and having data storage capacity of at least four (4) gigabytes. Also preferred is a printer suitable for text and color graphical report printing; automatic back-up capability for data and configuration files; and trackball or mouse support. The present invention may be implemented via other computing devices, including, but not limited to, mainframe computing systems and mini-computers. It is preferable to use a high resolution color display; however, a standard personal computer monitor may be used.

The present invention may be written in various computer languages including, but not limited to, C++, Smalltalk, Java, and other conventional programming languages such as BASIC, FORTRAN and COBOL.

The present invention runs on current standard desktop computer platforms such as, but not limited to, Windows®, Windows 95®, Windows NT®, UNIX®, and OS/2®. The present invention utilizes, in part, many standard features of current desktop configurations, such as the ability to store data locally, connect to the Internet, and display visual information.

Computer readable program code means is provided for receiving processing system operation related information from each of a plurality of mail insertion devices, and for representing each of the mail insertion devices as an interactive icon on a display connected to a data processing system. Each interactive icon has indicia associated therewith which displays the operation related information for a respective mail insertion device and changes appearance in response to a change in the operation related information. Computer readable program code means is provided for displaying selective operation related information about a respective mail insertion device in response to user actions, and for displaying operation related information for each mail insertion device in real time. Computer readable program code means is provided for selecting an interactive icon via an input device operatively connected to the data processing system, and for displaying operating status for the mail insertion device represented by the selected icon.

Computer readable program code means is provided for displaying the indicia surrounding an icon as a color selected from a plurality of colors, wherein each color represents an operational condition of a mail insertion device. Computer readable program code means is provided for displaying interactive icons in a manner depicting geographical locations of respective mail insertion devices. Computer readable program code means is also provided for adding, deleting, and modifying the location and appearance of the interactive icons.

The present invention is not limited in scope to systems, methods and computer program products for monitoring and controlling mail insertion machines. The present invention may be utilized for monitoring and controlling various mail processing systems including mail sorters, printers and other equipment related thereto. The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims.

In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A system for remote real-time monitoring of at least one mail inserter machine comprising:
   (a) receiving means located remotely from said mail inserter machine for receiving operation related information from said mail inserter machine;
   (b) monitoring means operatively connected to said receiving means for monitoring the operation related information received from said mail inserter machine and updating display of the operation related information in real time; and
   (c) transmission means for sending data to said mail inserter machine.

2. The system of claim 1 wherein said receiving means and monitoring means are centrally located not necessarily proximate to said mail inserter machine.

3. The system of claim 1 wherein said receiving and monitoring means are coupled to a networked communications system for exchanging data with said mail inserter machine.

4. The system of claim 1 wherein said monitoring means updates display of the operation related information on a computer display screen at a rate of at least about one update per thirty seconds.

5. The system of claim 1 wherein said receiving means receives operation related information from a plurality of mail inserter machines located at a plurality of geographically separated sites.

6. The system of claim 1 wherein the operation related information includes mail inserter machine organizational information, site information, machine information, utility information, and system administration information.

7. The system of claim 6 wherein the mail inserter machine organizational information includes mail inserter machine site addition information, mail inserter machine site deletion information, and mail inserter machine site edit information, and mail inserter machine site job goal information.

8. The system of claim 6 wherein the mail inserter machine site information includes production information, goal information, job information, fault information, and alarm information with respect to a specified mail inserter machine site.

9. The system of claim 6 wherein the mail inserter machine machine information includes production information, goal information, job information, fault information, and alarm information with respect to said mail inserter machine.

10. The system of claim 6 wherein the mail inserter machine utility information includes alarm information, user administration information, shift information, language information, threshold setting information, and run-time manager information with respect to said mail inserter machine.

11. The system of claim 6 wherein the mail inserter machine system administration information includes report information, machine setup information, backup and restore information, and run tag editor information with respect to said mail inserter machine.

12. A method for real-time monitoring of at least one mail inserter machine comprising:
    (a) receiving operation related information from a mail inserter machine from a location remote from said mail inserter machine;
    (b) monitoring the operation related information received from said mail inserter machine, and updating display of the operation related information in real time; and
    (c) transmitting data to said mail inserter machine.

13. The method of claim 12 wherein said receiving means and monitoring means are centrally located not necessarily proximate to any of said mail inserter machine.

14. The method of claim 12 wherein said receiving and monitoring means are coupled to a networked communications system for exchanging data with said mail inserter machine.

15. The method of claim 12 wherein receiving the operation related information includes receiving the operation related information from a plurality of mail inserter machines located at a plurality of geographically separated sites.

16. The method of claim 12 wherein updating display of the operation related information in real time includes updating display of the operation related information at a rate of at least about one update per thirty seconds.

17. The method of claim 12 wherein the operation related information includes mail inserter machine organizational information, site information, machine information, utility information, and system administration information.

18. The method of claim 17 wherein the mail inserter machine machine information includes production information, goal information, job information, fault information, and alarm information with respect to said mail inserter machine.

19. The method of claim 17 wherein the mail inserter machine utility information includes alarm information, user administration information, shift information, language information, threshold setting information, and run-time manager information with respect to said mail inserter machine.

20. The method of claim 17 wherein the mail inserter machine system administration information includes report information, machine setup information, backup and restore information, and run tag editor information with respect to said mail inserter machine.

21. The method of claim 17 wherein the mail inserter machine organizational information includes mail inserter machine site addition information, mail inserter machine site deletion information, mail inserter machine device site edit information, and mail inserter machine site job goal information.

22. The method of claim 17 wherein the mail inserter machine site information includes production information, goal information, job information, fault information, and alarm information with respect to a specified mail inserter machine site.

23. A remote real-time monitoring device for remotely monitoring at least one mail inserter machine, said remote real-time monitoring device comprising:
    (a) operating parameter monitoring means located remotely from said at least one mail inserter machine for remotely monitoring the operating parameters of said at least one mail inserter machine and for updating display of the operating parameters in real time; and (b) computer network communications means coupled to the operating parameter monitoring means for transferring data between the remote real-time monitoring device and said at least one mail inserter machine.

24. The device of claim 23 further comprising operator setup means for remotely creating, maintaining, and communicating a list of valid mail inserter machine operators for said at least one mail inserter machine.

25. The device of claim 23 further comprising run-tag editing means for remotely accessing, editing, and re-saving stored run-tag data for a specified job on said at least one mail inserter machine.

26. The device of claim 25 wherein said run-tag editing means is capable of searching and selecting individual and multiple run-tags from a stored run-tag database.

27. The device of claim 23 further comprising alarm threshold setting means for setting alarm threshold levels of tolerable error counts for specified types of errors for a specified job on said at least one mail inserter machine.

28. The device of claim 27 wherein said specified types of errors include aim errors, insert feeder errors, envelope feeder errors, finishing errors, and delivery errors.

29. The device of claim 27 further comprising production threshold setting means for setting production threshold levels of output goals to be completed within or by a specified time for a specified job on said at least one mail inserter machine.

30. The device of claim 29 wherein said output goals represent the number of envelopes processed at a specified time.

31. The device of claim 29 wherein said operating parameter monitoring means monitors the production threshold levels and alarm threshold levels of said at least one mail inserter machine in real-time and outputs a message when said threshold levels have been violated.

32. A computer program product comprising computer-executable instructions embodied in a computer-readable medium for performing steps comprising:
   (a) receiving operation related information from at least one mail inserter machine from a location remote from said at least one mail inserter machine; and
   (b) updating display of the operation related information received from said mail inserter machine in real time.

33. The computer program product of claim 32 wherein receiving the operation related information includes receiving the operation related information over a TCP/IP network.

34. The computer program product of claim 32 comprising sending data to said mail inserter machine.

35. The computer program product of claim 32 wherein receiving the operation related information includes receiving the operation related information from a plurality of mail inserter machines located at geographically separated sites.

36. The computer program product of claim 32 wherein updating display of the operation related information in real time includes updating display of the operation related information at a rate of at least about one update per thirty seconds.

37. A system for remote real-time monitoring of at least one mail sorting machine, said system comprising:
   (a) receiving means for receiving operation related information from said mail sorting machine from a location remote from said at least one mail sorting machine; and
   (b) monitoring means operatively connected to said receiving means for monitoring the operation related information received from said mail sorting machine and updating display of the operation related information in real time.

38. The system of claim 37 comprising transmission means for sending data to said mail sorting machine.

39. The system of claim 38 wherein said receiving means receives operation related information from a plurality of mail sorting machines located at a plurality of sites geographically separated from each other.

40. The system of claim 37 wherein said monitoring means updates display of the operation related information on a computer display screen at a rate of at least about one update per thirty seconds.

41. A method for remote real-time monitoring of at least one mail sorting machine comprising:
   (a) receiving operation related information from a mail sorting machine from a location remote from said mail sorting machine; and
   (b) updating display of the operation related information in real time.

42. The method of claim 41 comprising transmitting data to said mail sorting machine.

43. The method of claim 41 wherein receiving the operation related information includes receiving the operation related information from a plurality of mail sorting machines located at geographically separate sites.

44. The method of claim 41 wherein updating display of the operation related information in real time includes updating display of the operation related information at a rate of at least about one update per thirty seconds.

45. A computer program product comprising computer-executable instructions embodied in a computer-readable medium for performing steps comprising:
   (a) receiving, from a user, a threshold percentage value relating to percentage completion of a job by at least one mail processing machine and a time value for checking whether the mail processing machine has reached the percentage;
   (b) receiving at least one measured percentage value indicating the percentage completion of a job by the mail processing machine from a location remote from the mail processing machine;
   (c) when the time value is reached, determining whether the measured percentage value equals the threshold percentage value; and
   (d) if the measured percentage value is less than the threshold percentage value, displaying an alarm to the user.

46. The computer program product of claim 45 wherein receiving at least one measured percentage value includes receiving at least one measured percentage value from one or more mail inserter machines.

47. The computer program product of claim 45 wherein receiving at least one measured percentage value includes receiving at least one measured percentage value from one or more mail sorting machines.

48. The computer program product of claim 45 wherein alerting the user includes displaying a pop-up window to the user.

49. The computer program product of claim 48 wherein the pop-up window displays the measured percentage value.

50. The computer program product of claim 45 comprising updating display of the measured percentage value in real time.

51. The computer program product of claim 50 wherein updating display of the measured percentage value includes updating display at a rate of at least about one update per thirty seconds.

52. A run tag editor comprising computer-executable instructions embodied in a computer-readable medium for performing steps comprising:

(a) searching a database for run tags indicative of jobs performed by at least one mail processing machine;

(b) displaying run tags extracted from the database to a user;

(c) receiving input from a user allowing modification of the displayed run tags and addition of new run tags; and (d) storing the modified or new run tags in the database.

53. The computer program product of claim 52 wherein run tags are indicative of jobs performed by a mail inserter machine.

54. The computer program product of claim 52 wherein the run tags are indicative of jobs performed by a mail sorting machine.

* * * * *